Figure 1:
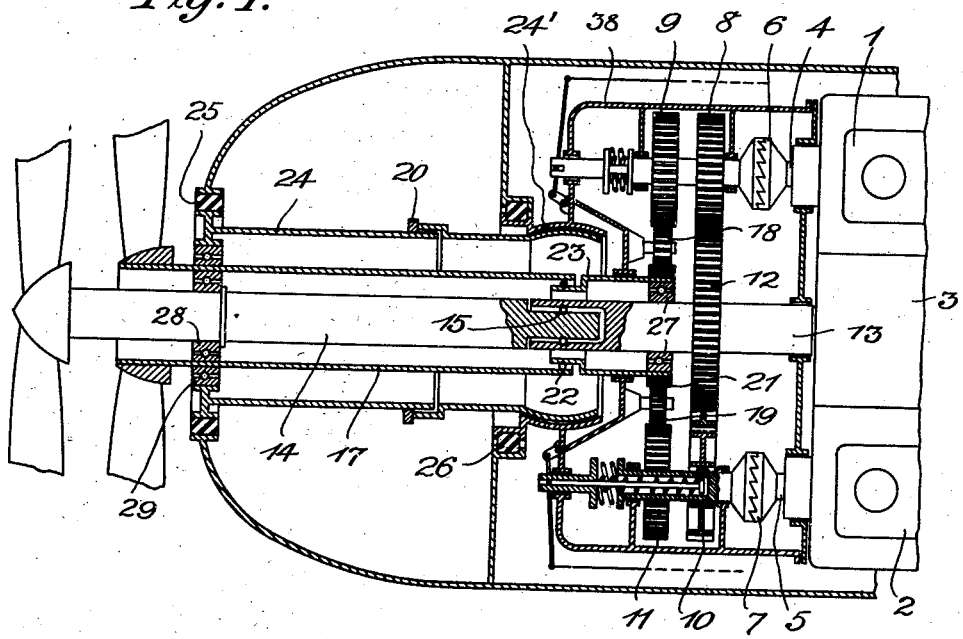

Dec. 15, 1942.   F. NALLINGER ET AL   2,305,454
BEARING FOR AIR PROPELLER SHAFTS
Filed April 18, 1940

Fritz Nallinger
Albert Friedrich
INVENTORS

BY
ATTORNEY

Patented Dec. 15, 1942

2,305,454

UNITED STATES PATENT OFFICE 2,305,454

BEARING FOR AIR PROPELLER SHAFTS

Fritz Nallinger, Stuttgart, and Albert Friedrich, Stuttgart-Bad Cannstatt, Germany; vested in the Alien Property Custodian Application April 18, 1940, Serial No. 330,324
In Germany December 21, 1938

7 Claims. (Cl. 64—1)

The invention relates to the driving mechanism of in opposite direction rotating air propeller shafts particularly by a number of motors, whereby said motors respectively their cylinders are mounted upon a common crank casing making an angle with each other. According to the invention the air propeller shafts are supported at one end swingingly and at the other end yieldingly and further supported in a sliding tube transmitting the tensile and shearing forces of the air propeller for instance to the motor- and gear block.

The invention has first the object, particularly in air craft driving mechanisms, to protect thin-walled parts or in a determined direction relatively not very strong construction parts against tensile- and shearing stresses or transverse shocks and -vibrations and to transmit these forces to such parts adapted to resist these stresses. As such a part may serve for instance the driving block.

Secondly the object of the invention is, notwithstanding the use of yieldingly supported motors of a yieldingly mounted motor- and driving unit or of in itself yielding parts serving for supporting the air propeller shaft, to ensure an unconstrained driving also when larger deformations or stronger vibrations of the yieldingly supported driving mechanism occur.

The sliding tube serving to support the air propeller shaft is in this case in a suitable manner swingable in the block of the driving unit and yieldingly supported in the hull body or the like construction part.

The mounting of the motor cylinders upon a common crank casing has the advantage of a compact construction and a simple support of the driving parts situated in front of the motors and driving the air propeller shafts rotating in opposite direction. Moreover the dangerous displacements of both main driving shafts with respect to each other are prevented and the driving unit can be hung in a simple manner in the air craft.

Figure 2:
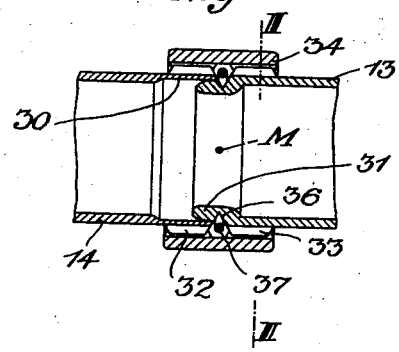
Figure 3:
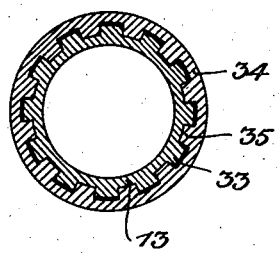

In the drawing a diagrammatical form of execution according to the invention is shown. Herein is:

Fig. 1 a multiple motor driving mechanism for two in opposite direction rotating air propeller shafts in length sectional view;

Fig. 2 the construction of the two parts of the air propeller shaft in length sectional view, and Fig. 3 a cross-sectional view through the line III—III of Fig. 2.

The cylinders of both combustion engines 1 and 2 are mounted upon the common crank casing 3 making an angle with each other. Both outsidely lengthened crank shafts 4 and 5 are provided with free-wheel couplings 6, 7 as well as with gear wheels 8, 9 and 10, 11 respectively. The gear wheels 8, 10 engage the centrally mounted gear wheel 12 connected to the shaft 13. The inner air propeller shaft 14 is connected to the shaft 13 by an elastic coupling 15. Both gear wheels 9, 11 are driving through transmitting wheels 18, 19 the centrally mounted gear wheel 21 of the outer air propeller shaft 17 rotating in opposite direction. The said shaft .7 is coupled to the centrally mounted shaft 23 by an elastic coupling 22, said shaft being also connected to the gear wheel 21. The sliding tube 24, being adjustable in length direction for instance by an adjusting ring 20, is supported in an articulated bearing 24' of the gear casing lid. The yielding support of the sliding tube 24 is effected for instance by rubber rings 25 and 26.

It is self-evident that the arrangement may also be so, that the driving motors are provided with separate crank casings.

The outer air propeller shaft 17 bears unyieldingly upon the inner air propeller shaft 13/14 at the end directed to the motor at 27 and at the end directed to the air propeller at 28. The outer air propeller shaft is in its turn unyieldingly supported at the end directed to the propeller in the sliding tube 24 at 29. As well as the bearing length of the sliding tube 24 is adjustable at 20, also the bearing length of the air propeller shafts 14, 17 may be adjustable at the hinging spots 15, 22.

As coupling within the air propeller shafts suffices according to Fig. 1 a simple cam gear with a small clearance in order to allow a swinging movement of the outer part of the shaft.

A shaft coupling as shown in Figs. 2 and 3 has proved to be very advantageous. According to this form of execution the end of the air propeller shaft directed to the coupling point is at 30 cylindrically turned out and on the contrary the end of the shaft 13 has a ball-shaped smaller end 31, fitting with its largest outer diameter exactly in the part 30 and ensures in this manner an equal axial position of both shafts 13 and 14. The end of the air propeller shaft 14 is extending about the length of the part 30 provided with a gear 32 and the corresponding end of the shaft 13 has directly behind the smaller part 31 an equal gear 33. Over both gears 32 and 33 together a coupling ring 34 is slipped with a suitable inner gear 35. The inner gear 35 of the coupling ring 34 is provided with a ring shaped grooved 36 containing a spring ring 37. The ring 37 prevents the coupling ring from displacing axially with respect to the gear 32 and 33.

Between the inner gear 35 of the coupling ring and the gears 32, 33 is a small clearance enabling a swinging movement of the shaft 14 around the ball-shaped part 31 of the shaft 13 as far as the elasticity of the yielding support 25 allows. The swinging movement of the air propeller shaft 15 takes place substantially about a centre M, forming at the same time the centre for the radius of curve of the swinging bearing 24'.

By the arrangement according to the invention particularly by the described support of the sliding tube respectively of the air propeller shaft is obtained that when the yieldingly supported driving unit swings, the air propeller shafts together with the sliding tube is allowed to swing about the centre M of the swinging bearing 24' and clamping tensiles will not engage the air propeller shaft. The rubber bearing 25 prevents hereby at the same time an undamped transmission of the vibrations and shocks to the relative weak hull lining or bracing. At the same time the yielding support 25 enables, however, also an axial displacement of the sliding tube 24 in such a manner that said sliding tube 24 transmits the shearing tensiles to the swing gear 24', where the same are taken up by the gear casing 38 and the crank casing 3.

What we claim is:

1. In an aircraft having propellers rotating in opposite directions, a fuselage and a motor assembly including a plurality of driving shafts, the combination of a plurality of propeller shafts extending coaxially within one another, coupling means connecting the inner end of each propeller shaft with the outer end of a corresponding driving shaft so as to transmit the torque of the driving shaft to the propeller shaft and to permit slight pivotal movements of the latter relative to the former, an elongated member surrounding the propeller shafts, means including a part rigid with the motor assembly to pivotally support the inner end of said elongated member secure against axial displacements, and means for elastically mounting the outer end of said elongated member in the fuselage.

2. A combination, as claimed in claim 1, including bearing means for the outer ends of said propeller shafts, said bearing means being mounted in said elongated member and adapted to transmit tensile stresses and pressure stresses to the latter.

3. A combination, as claimed in claim 1, including means for elastically supporting the pivoted end of said elongated member on the fuselage.

4. A combination, as claimed in claim 1, including means to vary the length of said elongated member.

5. In an aircraft having propellers rotating in opposite directions, a fuselage and a motor assembly, the combination of a first hollow driving shaft coupled to the motor assembly, a second driving shaft coupled to the motor assembly, said second driving shaft being coaxial with and extending within said hollow driving shaft, a first hollow propeller shaft, a second propeller shaft coaxial with and extending through said hollow propeller shaft, coupling means connecting the inner end of each propeller shaft to the outer end of the corresponding driving shaft so as to transmit the torque of the driving shaft to the propeller shaft and to permit slight pivotal movement of the latter relative to the former, a tubular member surrounding said propeller shafts, bearing means for the outer ends of said propeller shafts mounted in said tubular member, means including a part rigid with the motor assembly to pivotally support the inner end of said tubular member secure against axial displacements, and means for elastically mounting the outer end of said tubular member in the fuselage.

6. In an aircraft having propellers rotating in opposite directions, the combination of a first hollow driving shaft, a second driving shaft coaxial with and extending within said hollow driving shaft, a first hollow propeller shaft substantially aligned with said hollow driving shaft, a second propeller shaft coaxial with and extending through said hollow propeller shaft and substantially aligned with said second driving shaft, the inner end of each propeller shaft being provided with a cylindrical recess, the outer end of each driving shaft being tapered on a substantially spherical curvature and fitting with its spherically tapered end into the cylindrical recess of the corresponding propeller shaft, coupling means connecting the inner end of each propeller shaft to the outer end of the corresponding driving shaft so as to transmit the torque of the driving shaft to the propeller shaft and to permit slight pivotal movements of the latter relative to the former, and bearing means elastically supporting the outer ends of said propeller shafts.

7. In an aircraft having propellers rotating in opposite directions, a fuselage and a motor assembly, the combination of a first hollow driving shaft coupled to the motor assembly, a second driving shaft coupled to the motor assembly, said second driving shaft being coaxial with and extending within said hollow driving shaft, a first hollow propeller shaft substantially aligned with said hollow driving shaft, a second propeller shaft coaxial with and extending through said hollow propeller shaft and substantially aligned with said second driving shaft, a tubular member surrounding said propeller shafts, bearing means for the outer ends of said propeller shafts mounted in said tubular member, means for elastically supporting the outer end of said tubular member in the fuselage, means including a part rigid with the motor assembly to support the inner end of said tubular member for universal pivotal movements about an imaginary pivot point disposed in the axis of said shafts, and coupling means connecting the inner end of each propeller shaft with the corresponding driving shaft so as to transmit the torque of the driving shaft to the propeller shaft and to permit slight pivotal movements of the latter relative to the former, the inner end of each propeller shaft being provided with a cylindrical recess, and the outer end of each driving shaft being tapered on a substantially spherical curvature having its center coinciding with said imaginary pivot point, each driving shaft fitting with its spherically tapered end into the cylindrical recess of the corresponding propeller shaft.

FRITZ NALLINGER.
ALBERT FRIEDRICH.